US010426101B2

(12) United States Patent
Galdi

(10) Patent No.: US 10,426,101 B2
(45) Date of Patent: Oct. 1, 2019

(54) PLANT POT WITH IRREGULAR BOTTOM EDGE

(71) Applicant: Julie A. Galdi, Wyckoff, NJ (US)

(72) Inventor: Julie A. Galdi, Wyckoff, NJ (US)

(*) Notice: Subject to any disclaimer, the term of this patent is extended or adjusted under 35 U.S.C. 154(b) by 0 days.

(21) Appl. No.: 15/243,562

(22) Filed: Aug. 22, 2016

(65) Prior Publication Data

US 2016/0374275 A1 Dec. 29, 2016

Related U.S. Application Data

(63) Continuation-in-part of application No. 15/218,780, filed on Jul. 25, 2016, now abandoned, which is a continuation-in-part of application No. 13/738,177, filed on Jan. 10, 2013, now abandoned.

(60) Provisional application No. 61/584,869, filed on Jan. 10, 2012.

(51) Int. Cl.
*A01G 9/029* (2018.01)
*A01G 9/02* (2018.01)

(52) U.S. Cl.
CPC .............. *A01G 9/0291* (2018.02); *A01G 9/02* (2013.01); *A01G 9/021* (2013.01)

(58) Field of Classification Search
CPC .................................. A01G 9/02; A01G 9/021
USPC ..................... 47/32, 32.4, 32.7, 33, 65.5, 73
See application file for complete search history.

(56) References Cited

U.S. PATENT DOCUMENTS 223,093 A * 12/1879 Barnhill ............. A01G 13/0243 256/11
584,433 A * 6/1897 Walker .................. A01G 9/104 47/73
592,640 A * 10/1897 Orner ................ A01G 13/0243 47/30
610,156 A * 8/1898 Mechwart ............. A01G 9/104 206/423
1,776,375 A * 9/1930 Russell .................... A01G 9/02 47/66.3
2,184,904 A * 12/1939 Boehme .................. A01G 1/08 29/428
2,782,561 A * 2/1957 Smith ................ A01G 13/0237 47/21.1

(Continued)

FOREIGN PATENT DOCUMENTS

GB 769696 A * 3/1957 ......... A01G 13/0243

*Primary Examiner* — Magdalena Topolski
*Assistant Examiner* — Morgan T Barlow
(74) *Attorney, Agent, or Firm* — Ellenoff Grossman & Schole LLP; James M. Smedley, Esq

(57) ABSTRACT

A pot for containing a plant having a bottom peripheral edge adapted for insertion or installation into a garden bed. In one embodiment, the pot is a normal truncated conical shape and the lower peripheral edge is irregular so as to use that bottom edge to more securely position the pot within a hole in the ground. The irregularity of the lower peripheral edge can be a plurality of teeth that bite into the ground and position the pot in the hole when the user rotates the pot while forcing it downwardly toward the ground. The bottom edge is thus used to cause the pot to settle firmly within the hole dug in the ground. In another embodiment, the pot is empty and is installed in the garden to provide decoration, by positioning the pot against the garden bed, and then pushing the pot into place. The upper rim of the pot may be decorative and may be located above the level of the ground.

9 Claims, 8 Drawing Sheets

12
58a
46
58b
52
54
80
82

(56) References Cited

U.S. PATENT DOCUMENTS 2,784,528 A * 3/1957 Rudenauer ............ A01G 25/00 47/21.1
3,277,606 A * 10/1966 Cohen ..................... A01G 1/08 47/33
4,809,460 A * 3/1989 Futch ...................... A01G 1/08 47/33
4,847,741 A * 7/1989 Boettinger ............ A01G 7/045 362/122
5,513,466 A * 5/1996 Mercier ............ A01G 13/0243 47/30
5,566,503 A * 10/1996 Nickson .................. A01G 1/08 47/30
5,647,169 A * 7/1997 Bui ....................... A01G 13/10 47/33
5,661,925 A * 9/1997 MacMaster ........ A01G 13/0237 47/32.4
5,819,468 A * 10/1998 Jollie ................ A01G 13/0243 47/32.4
6,223,466 B1 * 5/2001 Billings .................. A01G 9/02 47/75
6,539,665 B1 * 4/2003 Llona ...................... A01G 9/02 206/423
7,428,798 B2 * 9/2008 Abney, II ................ A01G 9/02 47/66.1
8,484,888 B2 * 7/2013 Butler .................... A01G 29/00 405/262
8,763,306 B1 * 7/2014 Perlsweig ............. A01G 13/10 47/41.1
8,826,588 B1 * 9/2014 MacKichan ............ A01G 9/12 47/30
9,668,428 B1 * 6/2017 Frame ..................... A01G 9/02
2002/0189161 A1 * 12/2002 Rice .................. A01G 13/0281 47/20.1
2003/0029079 A1 * 2/2003 Kleinert ................ A01G 13/10 47/32.4
2003/0213175 A1 * 11/2003 Rhindress ............. A01G 9/029 47/73
2005/0086861 A1 * 4/2005 Atchley .................. A01G 9/02 47/65.5
2007/0227068 A1 * 10/2007 Cataldi ................... A01G 9/02 47/66.1
2008/0256855 A1 * 10/2008 Helmy .............. A01G 13/0281 47/33
2010/0170154 A1 * 7/2010 Ahn ...................... A47G 7/025 47/71
2011/0258923 A1 * 10/2011 Lais .................. A01G 13/0243 47/32.6
2012/0131850 A1 * 5/2012 Chen ....................... A01G 9/02 47/65.5
2012/0227316 A1 * 9/2012 Ptak ........................ A01G 9/02 47/32.3
2012/0233917 A1 * 9/2012 Sovey-Strah ........... A01G 9/02 47/66.3
2012/0260570 A1 * 10/2012 Harbaugh ............... A01G 9/02 47/65.7
2013/0174482 A1 * 7/2013 Galdi ...................... A01G 9/02 47/65.7
2014/0017659 A1 * 1/2014 Steinman ............ A01N 1/0273 435/1.2
2015/0289454 A1 * 10/2015 Legus ..................... A01G 9/12 47/45
2015/0313095 A1 * 11/2015 Fenner, Jr. ............ A01G 7/045 47/84
2016/0198642 A1 * 7/2016 Suphachadiwong .. A01G 9/024 47/65.7
2016/0270305 A1 * 9/2016 Shaffer ............... A01G 13/105
2017/0339835 A1 * 11/2017 Measday ................. A01G 9/28

* cited by examiner

PLANT POT WITH IRREGULAR BOTTOM EDGE

CROSS-REFERENCE TO RELATED APPLICATIONS

The present application is a continuation-in-part of and claims priority from non-provisional patent application Ser. No. 15/218,780 filed on Jul. 25, 2016, which is a continuation-in part of patent application Ser. No. 13/738,177 filed on Jan. 10, 2013 which, in turn, claims priority from provisional application 61/584,869 filed on Jan. 10, 2012. The entire contents of each of these applications are hereby incorporated by reference into this application.

BACKGROUND OF INVENTION

The present invention relates generally to the area of gardening and particularly to pots containing and displaying plants, including flowers. More particularly, the invention concerns a pot for plants that does not have a bottom associated therewith.

In the area of gardening, and including both indoor and outdoor gardening activities, it is known that plant pots have been and are available at either lack of bottom or a bottom that is removable. Most of the pots for which bottoms are either lacking or are removable, offer such feature to enable the gardener to remove the plant and its surrounding soil with ease. It should be noted that most pots for plants have an open top and tapered vertical side walls, so that diameter of the pot increases from the bottom thereof to the open top. In this connection, therefore, the pot having the removable bottom or lacking a bottom entirely can be seen to facilitate the ease of removal of the plant from the pot, when such is desired.

In general, plants disposed in self-standing pots of the type described, are usually intended for presentation and location above ground, and often in a nursery, or other structure as well as in the home, office and other habitats and environments. More recently, interest has also developed in the ability for plants in such pots to be disposed in an outdoor environment and particularly, within a garden. In such connection, the gardener likewise wishes to place the pot with the plant and its surrounding soil disposed therein, at least partially into the ground of the garden.

One of the difficulties that has attended the disposition of such pots and plants within an outdoor garden environment has been the means by which the plant could be easily and securely positioned within the garden. That is, while a hole or the like could be excavated in the garden bed to receive the potted plant, there would remain the stable securement of the plant within the hole following the insertion thereinto. Often, the weather conditions in the outdoor environment are uncertain and frequently turbulent, so that the disposition of the plant within the garden bed could be in jeopardy. Thus, while a closely configured hole could be excavated and the pot with the plant material contained therein could be inserted therein, the exposure of the plant to rain, wind, and the like might dislodge the plant and thereby subject the plant to damage or destruction as a result.

Accordingly, a need is believed to exist for a simple, efficient and secure construction and corresponding procedure whereby potted plants may be disposed in and outdoor environment within a garden and may retain a stable disposition in a secure growing environment and will likewise gain the benefits of the improvement and appearance that often results from disposition in an outdoor growing environment. It is toward the achievement of the afore-noted objectives and objects that the present invention is directed.

SUMMARY OF THE INVENTION

Accordingly, in a first embodiment, the present invention relates to a pot for a plant such as a flower plant that can be used to secure the position of the pot within a hole dug in the ground.

Thus, according to an embodiment of the present invention, a pot has means for securing the pot within a hole dug in the ground, comprising a continuous side wall with a lower peripheral edge that has a suitably configured margin or formation, which margin or formation assists in the insertion of the pot into a garden bed, and can be used when inserted in a pre-dug hole in such garden bed, to pass through or remove dirt at either the side walls or the bottom thereof, to thereby stabilize the positioning of the pot within such hole. In other embodiments, no pre-dug hole is required.

In an exemplary embodiment, the irregular margin or formation is a serrated lower edge and may be one or more downwardly directed teeth for engaging and cutting into the ground. In one exemplary embodiment, the teeth are formed around the entire periphery of the lower edge of the flower pot.

As such, with the present invention, the pot preferably containing a plant and surrounding soil therein, can be placed in a pre-dug hole in the ground and then rotated about its longitudinal axis by the user while applying a downward force to cause the teeth to bite into and secure the resting position of the pot within the hole.

In a second embodiment, the plant pot of the invention can be used for purposes of decoration for plants already present in an outside garden. The pot is thereby prepared with a decorative upper rim and a lower margin or formation adapted for insertion into the ground. The pot can be inserted into the ground with the rim facing upward and the margin or formation placed against the garden bed, with installation being made such as by downward pressure applied against the rim to urge the pot into the ground. The pot in this embodiment is likewise visible with the decorative rim thereof facing upward in the garden bed after insertion. Such installation can be made where there is no hole in the ground and also, when the pot is empty, so that the pot provides a decorative frame that surrounds a plant already in the ground.

By using the pot in the manners described, it is assured that the pot is securely located within the hole that has been dug, and will remain stably therein despite adverse outdoor conditions. Likewise, and in the alternative instance where such a pot may be placed in the ground prior to the introduction of a plant and soil thereinto, the same stability is assured.

These and other features and advantages of the present invention will become more readily apparent during the following detailed description taken in conjunction with the drawings herein.

DETAILED DESCRIPTION OF THE INVENTION

Figure 1:
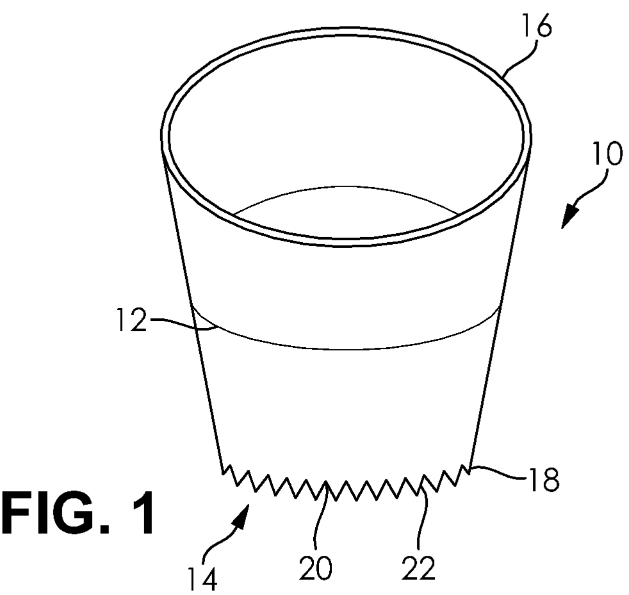
FIG. 1 is perspective view of a plant pot of the present invention.

Referring now to FIG. 1, there is shown, a perspective view of a pot 10 constructed in accordance with the present invention. As can be seen, pot 10 is comprised of a continuous side wall 12 and an open bottom 14. As is conventional with the shape of flower pots, the continuous side wall 12 may be a truncated conical shape with a larger diameter top edge 16 and a smaller diameter lower peripheral edge 18. The terms pot, plant pot, planter pot, and flower pot shall be shall be considered equivalent, interchangeable terms throughout this application.

The lower peripheral edge 18 is designed to be of an irregular shape that enables the lower peripheral edge 18 to be used for the purpose of the present invention, that is, to secure the location of the flower pot 10 within a hole that has been dug in the ground.

In the embodiment of FIG. 1, that irregular shape of the lower peripheral edge 18 is a serrated edge and can include a plurality of v-shaped indentations 20 and downwardly directed v-shaped teeth 22.

As shown, the irregular shape can be provided fully along the entire periphery of the lower peripheral edge 18, or, alternatively, can be discrete irregularities, such as the teeth 22, or groups of teeth 22. It is sufficient that there are enough teeth 22 to carry out the purpose of the presence of the irregular lower peripheral edge 18 as will be later explained.

The pot 10 may be comprised of a variety of materials, such as suitable plastic materials, metals or clay. Particular materials that are contemplated include wood, stone, plastic power, and plastics such as fiberglass, polyurethane and polypropylene, and any combination of the aforesaid materials. Further, it should be understood that the invention is not limited by the composition of the material from which the pot is constructed, and all suitable materials are to be included herein.

Figure 2:
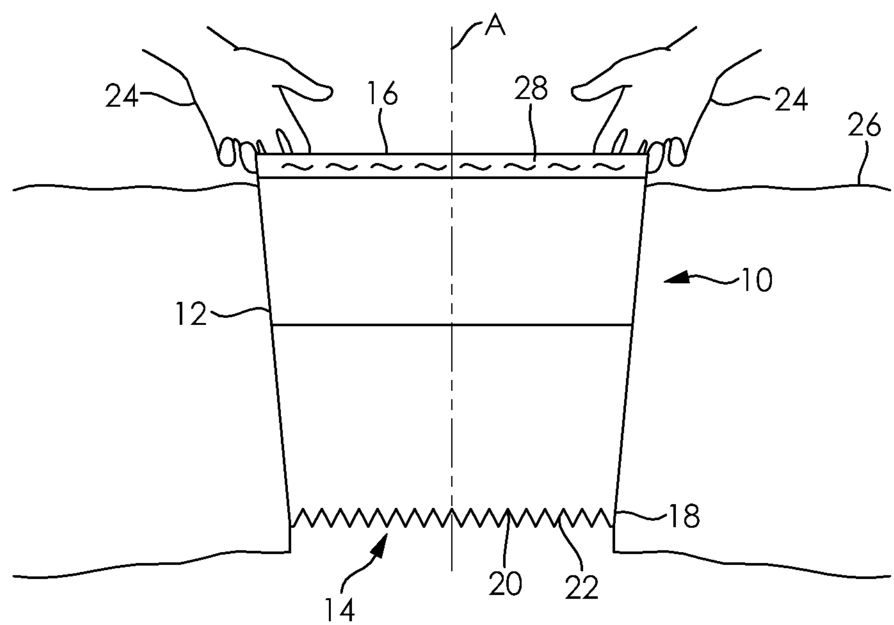
FIG. 2 is a side view of the plant pot of FIG. 1 and illustrating the method of the present invention used to secure the pot within a hole in the ground.

Turning now to FIG. 2, there is shown a side view of pot 10 of FIG. 1 and illustrating the embodiment where the irregular surface of the lower peripheral edge 18 is comprised of teeth 22 in order to illustrate the method of securing the position of pot 10 within a hole in the garden bed, in accordance with the present invention.

In FIG. 2, therefore, it can be seen that the hands 24 of the user are shown grasping the top edge 16 of the pot 10, and that the pot 10 is submerged beneath the surface of the ground 26 in a hole that has been previously dug for pot 10.

Accordingly, with this position, the user can simply rotate pot 10 about its central longitudinal axis "A" with the use of the hands 24, while exerting a downward force on the pot 10 to secure pot 10 in the ground.

The rotational motion exerted by the hands 22 on the pot 10 may be simply a continual one-direction rotation or may be a back and forth rotation in order to allow the teeth 22 to engage the side walls and bottom of the hole in the ground, and to thereby remove any dirt that may obstruct the desired insertion and securement of pot 10 within the ground.

Again, the present pot 10 and method of using the same can be used to securely embed the pot within the hole previously dug in the ground. As shown, the top edge 16 may remain above the level of the ground and may have a decorative finish 28.

Figure 3:
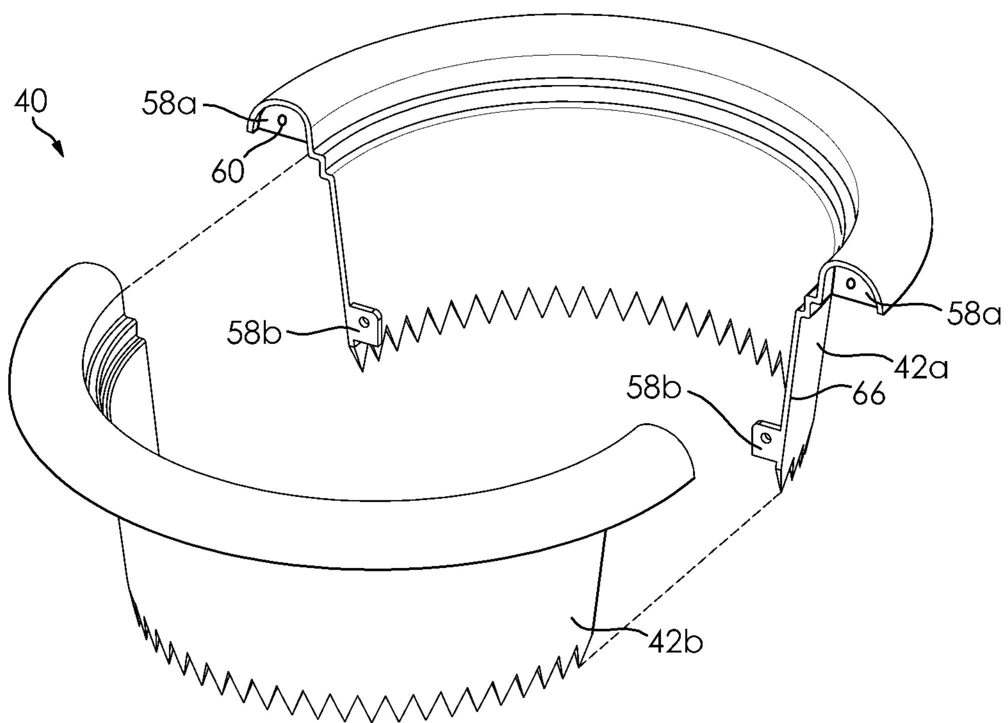
FIG. 3 is a perspective view of a two-part plant pot in accordance with an alternative embodiment of the invention.

Referring now to FIG. 3, pot 30 is shown that depicts a construction suitable for use as a frame for a plant already in a garden bed. Like pot 10 shown in FIG. 1, pot 30 has a continuous sidewall 32 and an open bottom 34. The lower margin or formation of pot 30, labeled 38, is shown as disposed at a bias or an angle with respect to the plane containing the upper rim or top edge 36, although this configuration is presented by way of non-limiting illustration only.

Figure 4:
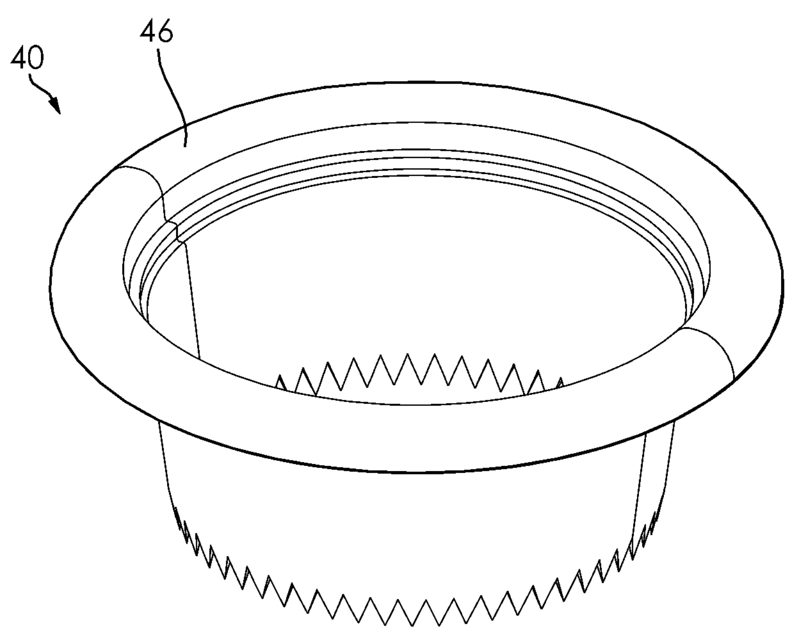
FIG. 4 is a perspective view of the two-part plant pot of FIG. 3 in which the parts are connected.

In practice, pot 30 may be lowered or inserted into an existing garden bed so that it frames or surrounds a plant already located and permanently installed in that bed. The biased lower margin or formation permits the placement of the product at an angle to the surface of the bed as well as in a flat or parallel position. The user needs only to place pot 30 in the desired position and orientation for insertion in the ground, and then push pot 30 downward, as by pressure against top edge 36. If desired or required, pot 30 may be rotated about its vertical axis, as is done with pot 10, to assist in the installation. A representative installation of pot 30 in a garden bed is shown in FIG. 4.

Figure 5:
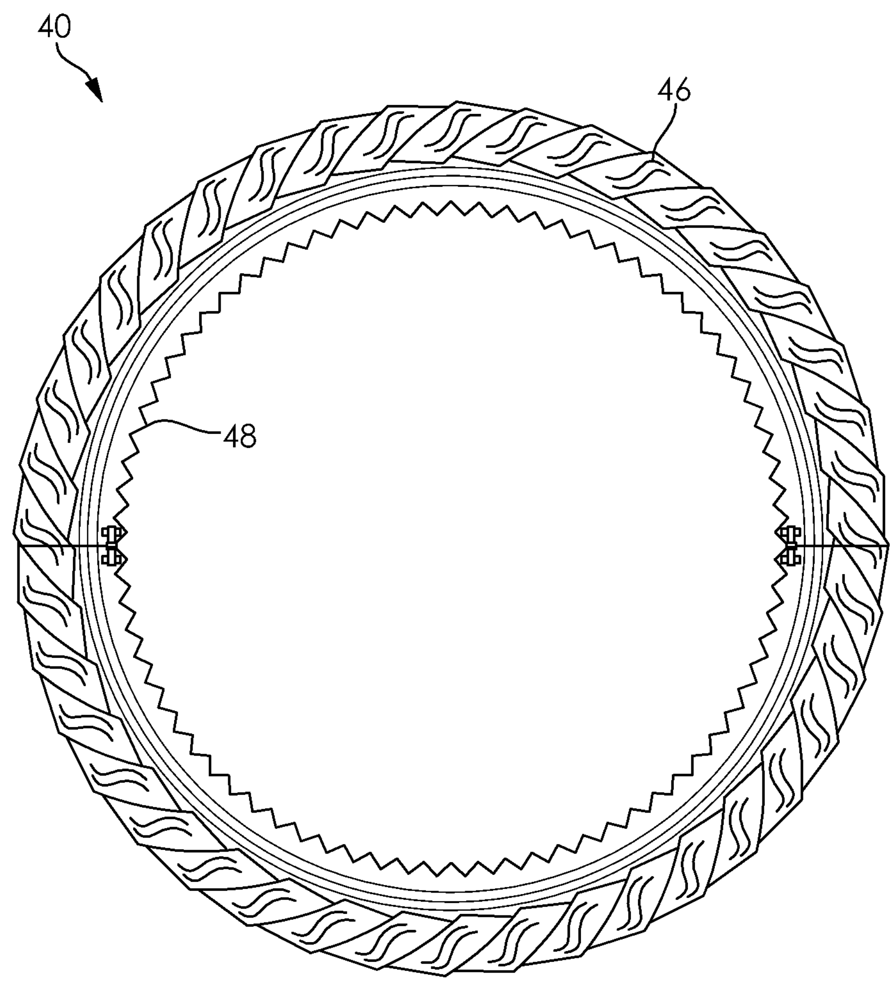
FIG. 5 is a top view of a two-part plant pot.
Figure 6:
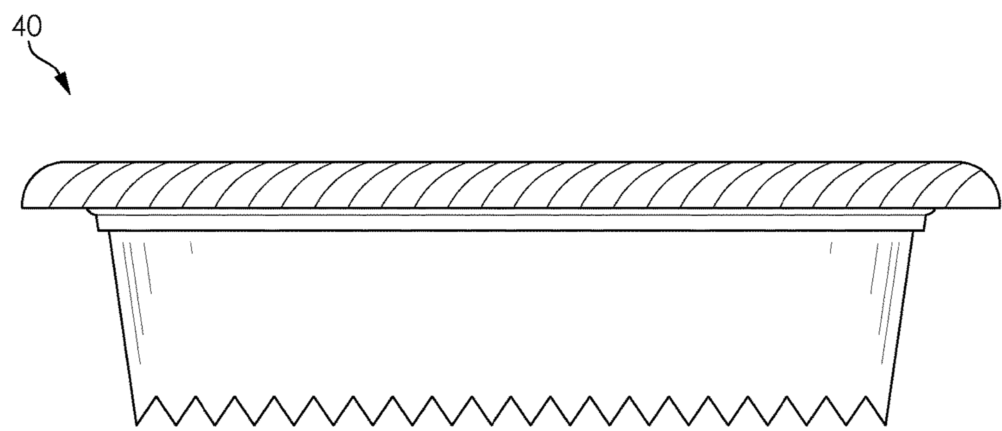
FIG. 6 is an elevation view of the embodiment of FIG. 5.
Figure 7:
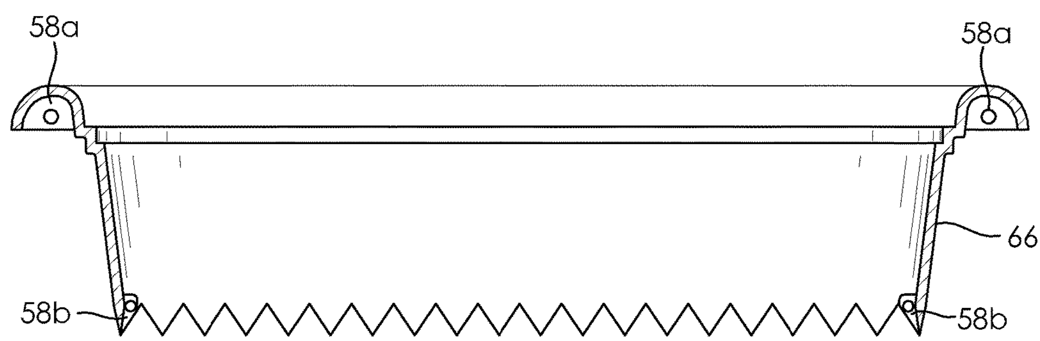
FIG. 7 is an elevation view of one of the plant pot halves of FIG. 3.
Figure 8:
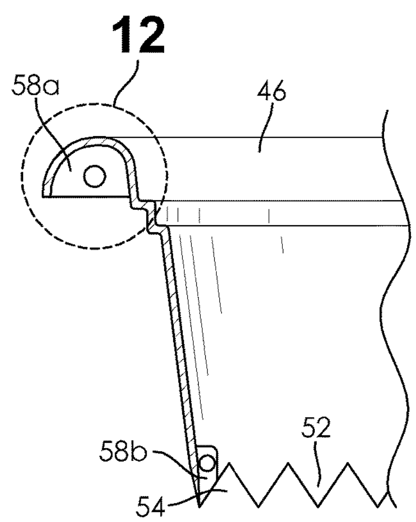
FIG. 8 is a partial view of one of the plant pot halves shown in FIG. 3.
Figure 9:
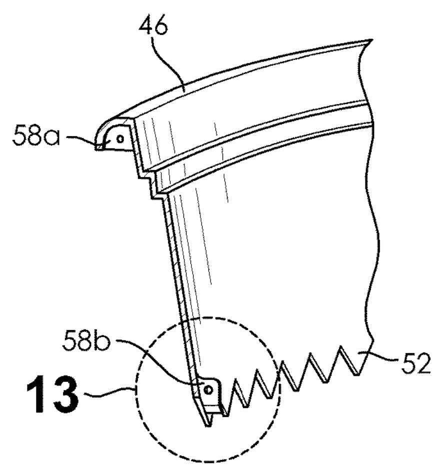
FIG. 9 is another partial view of the plant pot half of FIG. 8.
Figure 10:
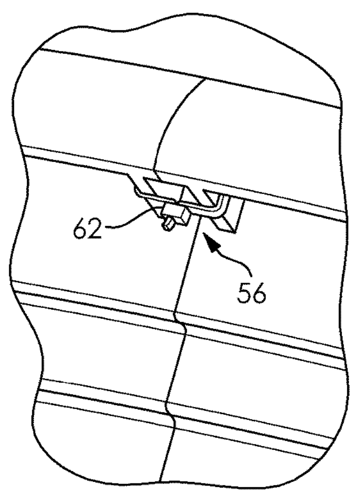
FIG. 10 is a partial view of the two-part plant pot showing an upper zip tie closure used to connect the plant pot halves.
Figure 11:
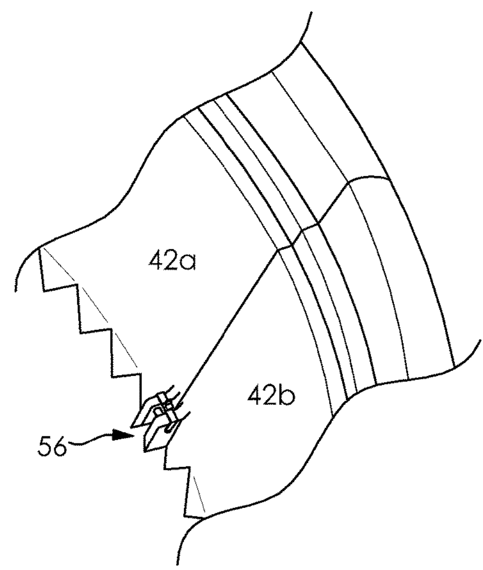
FIG. 11 is a partial view of the two-part plant pot showing a lower zip tie closure used to connect the plant pot halves.
Figure 12:
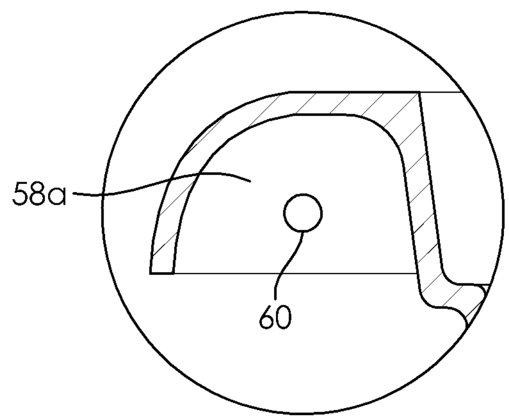
FIG. 12 is a close-up view of a top connection tab used to join the two plant pot halves.
Figure 13:
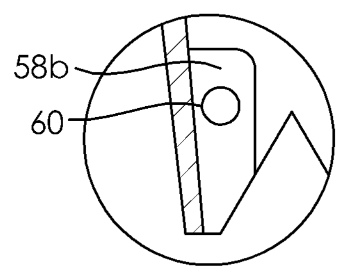
FIG. 13 is a close-up view of a bottom connection tab used to join the two plant pot halves.

In an alternate embodiment shown in FIGS. 5-6, a pot 40 is formed by attaching two or more sections (shown in the FIGS with two half sections). Specifically, FIGS. 5-6 depict a first semi-circular side wall 42*a* attaches to a second semi-circular side wall 42*b* by way of one or more fastening means to form a continuous, unbroken side wall of pot 40. FIGS. 10-13 illustrate how the two semi-circular walls are connected along their edges. The continuous side wall has an upper rim 46 and a lower peripheral edge 48 that defines an open bottom 50. The lower peripheral edge includes a formation of serrated teeth 52 separated by v-shaped indentations 54. The serrated teeth are suitable for gouging the ground, while pot 40 has sufficient rigidity to be inserted into the ground by rotating the pot to gouge the ground.

In a preferred version of this alternate embodiment, the one or more fastening means include four zip tie closures 56. The first zip tie closure adjoins the upper portion of the first semi-circular sidewall to an opposing upper portion of the second semi-circular wall. A second zip tie closure adjoins a lower portion of the first semi-circular sidewall to an opposing lower portion of the second semi-circular wall. A third zip tie closure adjoins an opposite end upper portion of the first semi-circular sidewall to an opposing upper portion of the second semi-circular wall. A fourth zip tie closure adjoins an opposite end lower portion of the first semi-circular sidewall to an opposing lower portion of the second semi-circular wall. In this way, the zip tie closures tightly join the first and second semi-circular walls together along their respective edges and hold them together in tight alignment.

Two of the zip tie closures include a pair of upper connection tabs 58*a* and two of the zip tie closures include a pair of lower connection tabs 58*b* with openings to allow a zip tie clasp 62 to be looped through the aligned openings and tightened around the connection tabs, thus tightly joining the semi-circular walls together along their respective edges 66. More specifically, the semi-circular walls are joined along their vertical cross-sectional surfaces, as defined by the thickness of the semi-circular walls. Although Applicant refers to upper and lower connection tabs, one of ordinary skill in the art will appreciate that the connection tabs may be positioned elsewhere along the edges of each semi-circular sidewall.

Figure 14:
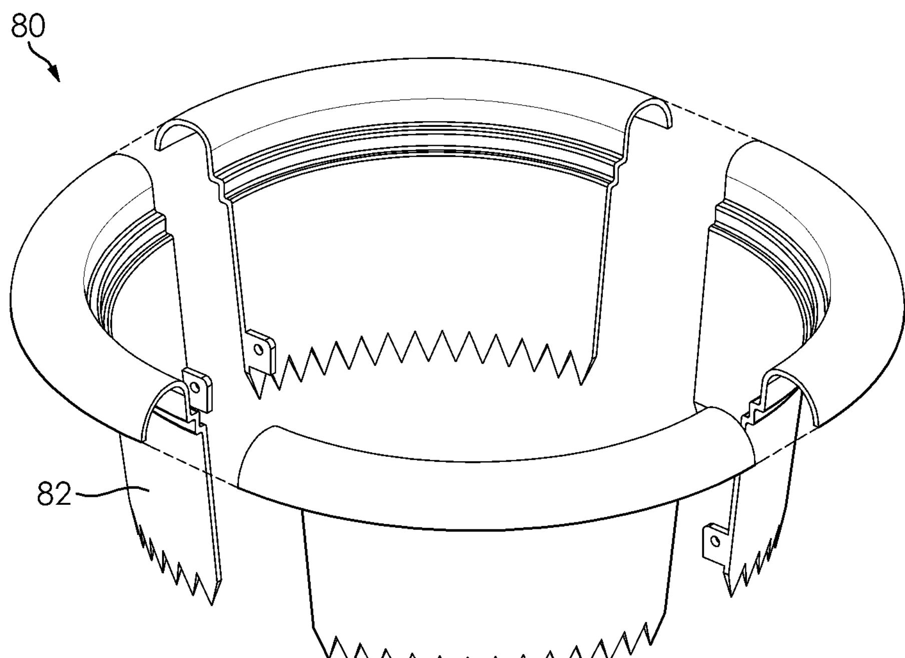
FIG. 14 is a perspective view of a four-part plant pot in accordance with another embodiment of the invention.

According to this alternate embodiment, each of the lower connection tabs 58*b* extend from a vertical edge 66 of the first or second semi-circular sidewalls, while the upper connection tabs 58*a* are integrated with the upper rim 46, forming a wall at both ends of the rim as shown in FIG. 14. When the semi-circular walls are joined together along their vertical cross-sectional surfaces the upper connection tabs 58*a* and lower connection tabs 58*b* of one semi-circular sidewall are joined with corresponding upper connection tabs 58*a* and lower connection tabs 58*b* of the other semi-circular wall. A zip tie clasp 62 can then be used to tie the tabs together by passing the zip tie clasp through the aligned openings 60 in each upper and lower pair of tabs and tightly locking the zip tie clasp around the tabs.

One of ordinary skill in the art will appreciate that the number of fastening means may vary from one embodiment to another. For instance, although the instant disclosure describes four zip tie closures, a different number of zip tie closures may be utilized to accomplish the objective of securely adjoining the first and second semi-circular sidewalls. Moreover, other types of connections may be utilized to securely adjoin the first and second semi-circular sidewalls. These other types of connections may include, but are not limited to, clips, pins, plugs, sockets, hooks, fasteners, latch mechanism, and other connectors that accomplish the stated objective. In addition, one of ordinary skill will recognize that the pot 40 may be formed from more than two semi-circular sections that are combined to form bottomless pot 40. In addition, the two half sections can be attached and detached as desired by a user by simply connecting and disconnecting the sections.

In still further embodiments of the present invention, the two or more semi-circular sections could be connected in a fixed but movable manner on one or more sections, such as with a hinge or other flexible means allowing for the opening and closing of the sections, and the fastening means may be utilized to secure the pot in a fixed position. In these embodiments, the hinges or other flexible means may be utilized to get the pot into position and then the pot may be secured together via one or more fastening means. One of ordinary skill in the art would appreciate that there are numerous types of hinges or other flexible means that could be utilized with embodiments of the present invention, and embodiments of the present invention are contemplated for use with any appropriate hinge or other flexible means.

Figure 16:
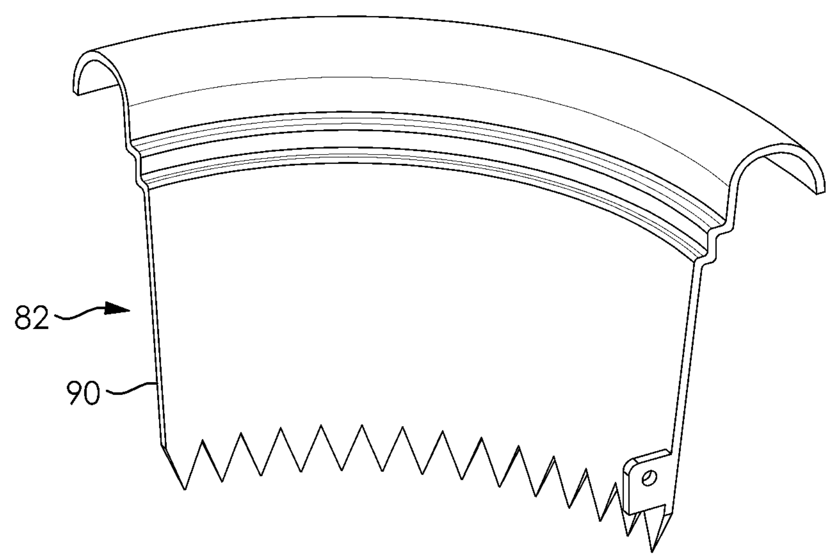
FIG. 16 is a perspective view of one of the parts of the four-part plant pot of FIG. 14.

In a further embodiment shown in FIG. 16 a method is provided for securing a planter pot in the ground and surrounding a plant. One step of the method includes providing a bottomless pot having two attached semi-circular sidewalls and a lower peripheral edge 70. The peripheral edge has a formation of serrated teeth suitable for digging into the ground. Another step includes placing the pot with lower peripheral edge in contact with the ground 72 and rotating the pot to cause the serrated teeth of the peripheral edge to move the dirt to securely position the pot within the ground 74. The pot may be rotated in different ways including rotating the pot in a back and forth motion, rotating the pot in a continuous circular motion, or any other way that is suitable for digging into the ground.

This method may further include placing the pot with the lower peripheral edge in contact with the ground over an existing plant already located in the ground. The pot can then be rotated as before to securely position the pot within the ground and frame the existing plant.

Some benefits of the plant pot described herein include protecting and enhancing the landscape. The plant pot is intended to add aesthetic appeal to an existing landscape while allowing plants to root directly into the ground, naturally. Further, the plant pot contains plants without the confinement of a traditional planter. Another important benefit is that the plant pot protects plants and low growing flowers from lawn mowers and trimmers. The sidewalls of the pot also act as a deterrent to rodents and other small animals, especially when the pot contains herbs.

The two-piece embodiment shown in FIGS. 5-6 provides added curb appeal by framing an object such as the post of a traditional mailbox. As previously discussed, the two pieces may be rotatably connected, as by a hinge, and can thus open and close around plants or other objects, such as lawn ornaments and lamp posts, while still having a large enough interior space to plant flowers. One of ordinary skill will appreciate that the planter pot can accommodate a wide variety of plants and/or objects.

According to another embodiment shown in FIG. 14, an expandable planter pot 80 is formed by connecting a set of arcuate sections or shells in such a manner that they form a continuous planter pot with no gaps between sections. When connected, each section is in tight alignment with each other section, such that the top and bottom edges of each section form a continuous rim and bottom edge, respectively, of said planter pot.

The arcuate sections are configured to be joined along their respective vertical sides, thereby forming a continuous, unbroken sidewall of the bottomless planter pot. The sidewall has an upper rim and a lower peripheral edge that defines an open bottom. The lower peripheral edge has a formation of serrated teeth suitable for gouging the ground and the assembled pot is sufficient rigid to be inserted into the ground by rotating the pot to gouge the ground.

Figure 15:
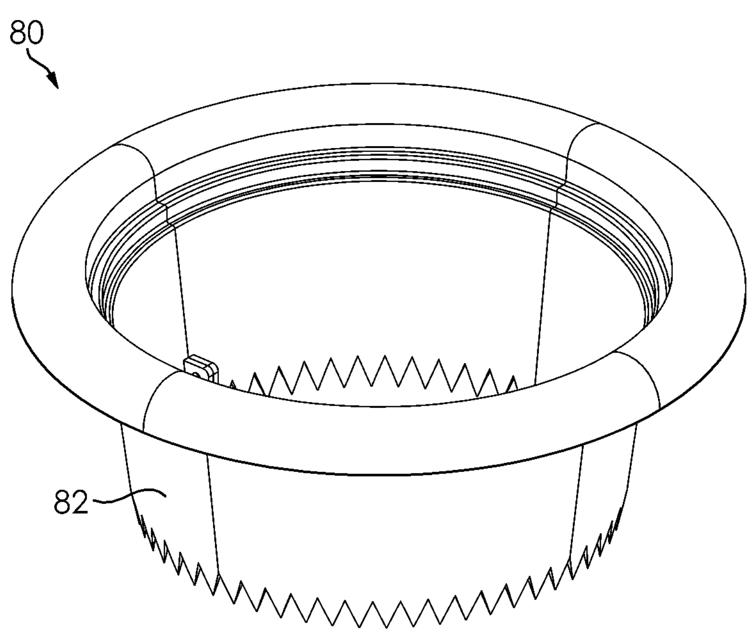
FIG. 15 is a perspective view of the four-part plant pot of FIG. 14 in which the parts are connected.

In the embodiment shown in FIGS. 14-15, the multi-part planter pot 80 is assembled from four arcuate sections. However, one of ordinary skill in the art will recognize that any number of sections can be used to form the multi-part planter pot. An individual section 82 of the multi-part planter pot is illustrated in FIG. 16, while a set of four adjoining sections is illustrated in FIG. 15. As with the planter pot described above, any suitable material may be used to form the individual sections, but in a preferred embodiment the sections are made of plastic through an injection molding process.

The arcuate sections 82 of the currently described embodiment may be connected to each other in any number of ways, including the zip-tie closures previously described. Other means of attachment include friction fitting or press-fitting one or more interface pins, nubs or other protuberances that extend from a section side into corresponding cavities in another section side. The sections can thus be plugged into each other forming a tight connection between sections.

As with the two-section planter pot described above, there are many ways to connect the sections including, but not limited to, clips, pins, plugs, sockets, hooks, fasteners, latch mechanism, and other connectors that accomplish the stated objective. In addition, one of ordinary skill will recognize that the multi-part pot 80 may be formed from more or less than four sections, such as two, three, five, six, seven, eight, nine, ten, or any number of sections. In every case, the arcuate sections will connect to form a planter pot with a continuous wall as described herein.

The size of the multi-part planter pot may be affected by the number of sections used to form the pot. For example, a pot composed of six sections may be larger than a pot composed of four sections. The size and/or number of arcuate sections used to assemble the expandable planter pot thus affects the overall size of the assembled pot. One or more arcuate sections may be added or removed from the planter pot to expand or reduce the size of the pot. More specifically, the surface area of the continuous wall of the planter pot is expanded when a section is added, and reduced when a section is removed. Furthermore, different sets of shells having different numbers, sizes, or shapes of shells can be sold as kits for assembling different sized or shaped planter pots.

In addition, each constituent section may include one or more wall extenders that extend from one or both vertical sides. The wall extenders can be attachable wall components that attach to the sides of two arcuate sections forming a bridge section between them, or may be slide-out wall extenders that slide out from a hollow wall of an arcuate section. The attachable wall extenders are separate components that connect two arcuate sections, thereby forming an expanded wall of the planter pot. Similarly, the slide-out wall extender extends from an arcuate section and connects to another arcuate section, thereby forming an expanded wall. In either case, the wall extender forms a connection between two arcuate sections using any of the connection means described in this application. The wall extenders expand the size of the planter pot by increasing the surface area of the continuous wall that defines the planter pot. The wall extenders thus allow a user to enlarge the size of the planter pot to accommodate different needs.

In a further embodiment, a method is provided for securing a multi-part bottomless planter pot in the ground to surround a plant. The method includes the step of attaching the arcuate sections together to form the multi-part bottomless planter pot 80. The planter pot is placed with the lower peripheral edge in contact with the ground and the pot is rotated to cause the serrated teeth to move the dirt so as to securely entrench the pot within the ground.

Those skilled in the art will readily recognize numerous adaptations and modifications which can be made to the plant pot and method of securing the location of the same in the ground using the pot, that will result in an improved pot and method of using the same, yet all of which will fall within the scope and spirit of the present invention as defined in the following claims. Accordingly, the invention is to be limited only by the following claims and their equivalents.

What is claimed is:

1. An expandable planter pot for insertion into the ground, the pot comprising:

a plurality of adjacent arcuate sections forming the expandable planter pot, a size of the expandable planter pot increasing or decreasing based on a number of adjacent arcuate sections included in the plurality of adjacent arcuate sections forming the expandable planter pot;

wherein each of the plurality of adjacent arcuate sections has a pair of upper connection tabs and a pair of lower connection tabs;

wherein each of the plurality of adjacent arcuate sections is joined to another adjacent arcuate section by aligning openings of the pair of upper connection tabs and openings of the pair of lower connection tabs of each arcuate section, using zip tie closures through the respective openings, thereby forming a continuous, unbroken sidewall of said planter pot, said sidewall comprising an upper rim and a lower peripheral edge that defines an open bottom, said lower peripheral edge comprising a formation of serrated teeth suitable for gouging the ground, wherein the pot is rigid for inserting into the ground by rotating the pot to gouge the ground;

wherein each of the pair of upper connection tabs:

is defined by the upper rim of each of the plurality of adjacent arcuate sections, is integrated with the upper rim, and forms a wall at both ends of the upper rim;

wherein each of the pair of upper connection tabs extends horizontally outward from an interior of the pot;

wherein each of the pair of lower connection tabs extends horizontally inward along a vertical cross-section of each of the plurality of adjacent arcuate sections; and wherein said lower peripheral edge defines the open bottom so that the expandable planter pot is bottomless.

2. The expandable planter pot of claim 1, wherein the plurality of adjacent arcuate sections includes four arcuate sections.

3. The expandable planter pot of claim 1, wherein the top rim has a decorative pattern on the outer surface.

4. The expandable planter pot of claim 1, wherein the continuous sidewall is a truncated conical shape.

5. The expandable planter pot of claim 1, wherein the pot is constructed of a plastic material.

6. The expandable planter pot of claim 1, wherein the formation of serrated teeth comprises at least one downwardly directed v-shaped tooth.

7. The expandable planter pot of claim 6, wherein the formation of serrated teeth comprises a plurality of downwardly directed v-shaped teeth.

8. The expandable planter pot of claim 1, wherein the formation of serrated teeth is formed around the entire periphery of the lower peripheral edge.

9. The expandable planter pot of claim 1, wherein each of the lower connection tabs comprises a flat side attached to one of the plurality of adjacent arcuate sections, and three free edges.

* * * * *